March 6, 1928.  L. JOSEPHSON  1,661,479
WRAPPER FOR FOOD PRODUCTS
Filed Feb. 4, 1927
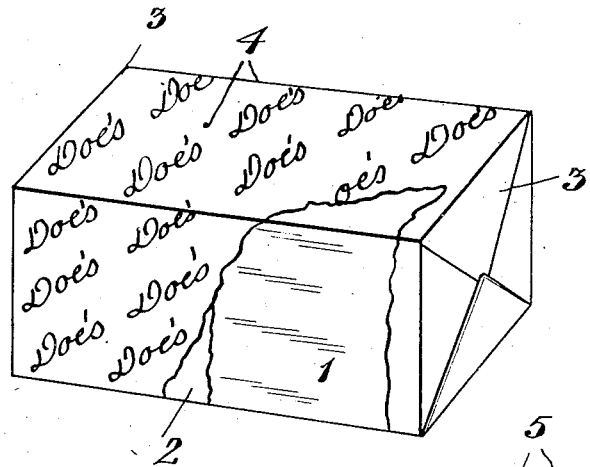
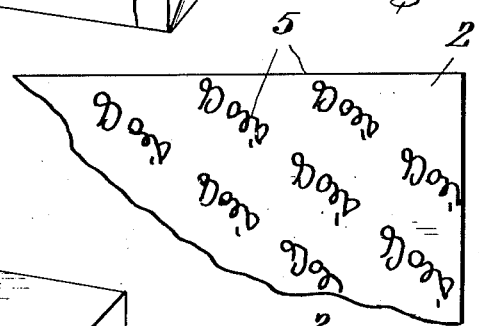
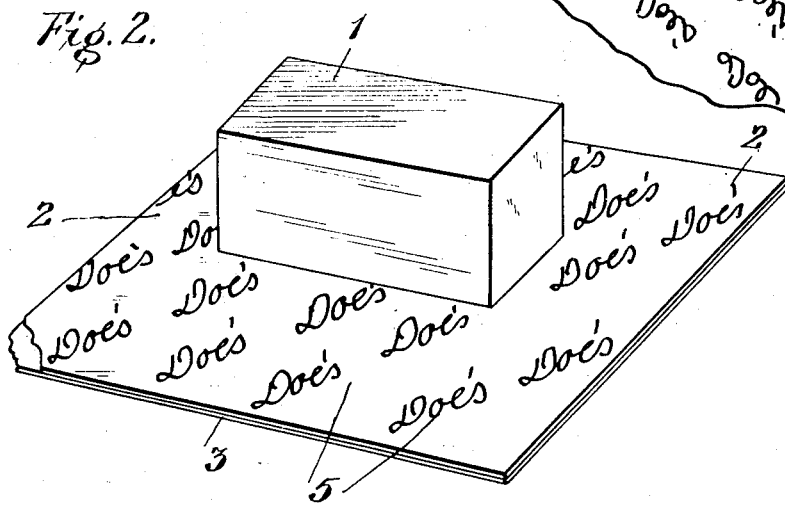
INVENTOR
Louis Josephson
BY
Harry Radzinsky
his ATTORNEY Patented Mar. 6, 1928.

1,661,479

UNITED STATES PATENT OFFICE.

LOUIS JOSEPHSON, OF NEW YORK, N. Y., ASSIGNOR TO BREAKSTONE BROS. INC., OF NEW YORK, N. Y., A CORPORATION OF NEW YORK.

WRAPPER FOR FOOD PRODUCTS.

Application filed February 4, 1927. Serial 165,803.

This invention relates to an improvement in a wrapper for food products, particularly such products as butter, cheese or the like and has for its object to provide a form of package or wrapper which will be entirely sanitary and which will advertise the product at all times whether the wrapper is completely in position about the product or whether it is partly torn away or folded back.

With these objects and such other objects as may hereinafter appear, in view, I have devised the particular arrangement of parts hereinafter set forth and more particularly pointed out in the claims appended hereto Reference is to be had to the accompanying drawing, forming a part hereof in which Figure 1 is a perspective view of a package in which my improved wrapper is used;

Figure 2 is a perspective view showing the wrapper folded out flat and acting as a protective support for a cake of butter, cheese or similar product;

Figure 3 is a view of the outer side of the inner wrapper.

Throughout the various views of the drawings, reference characters of the same denominations designate similar parts.

As was heretofore stated, my improved wrapper is particularly intended for use upon such food products as butter, cheese and the like, from which pieces are successively cut and sold. In other words, products of these kinds are generally sold in large cakes, which are kept upon a counter or in a show case, usually covered by glass, and small portions are cut off as required by the purchaser. Such products have been heretofore sold with wrappers which are usually removed when the package is first opened and in most instances, these wrappers are used as a protective support on top of a show case, counter or the like to keep the butter, cheese or similar product from contact with the top of the counter.

In the preferred embodiment of my invention as is disclosed in the accompanying drawing, 1 indicates a cake of butter, cheese or similar product. This is covered or wrapped by two layers of protective covering. The inner layer 2 is preferably made of a transparent or substantially transparent paper or any like material. The outer covering 3, which fits over and encloses the inner covering is preferably composed of some opaque material, such as tin foil or the like. The outer covering 3 may if desired bear printed advertising of the name of the manufacturer or dealer such as is disclosed at 4. Thus when the package is in its wrapped condition as is disclosed in Figure 1, the name of the manufacturer of the product clearly appears on the exterior wrapper. The inner wrapper which is of substantially transparent material is also provided with the name of the manufacturer or producer as is disclosed at 5 and this name or other advertising matter is preferably printed on the outer face of the inner wrapper so that the ink is not brought into actual contact with the food product and an entirely sanitary package is provided.

The printed matter or advertising 5 which appears on the inner wrapper 2 is preferably printed in reverse form on the outer face of the inner wrapper as is clearly disclosed in Figure 3, so that when a merchant upon purchasing the package unwraps wrappers and spreads the same out flat with the inner wrapper uppermost, the name or advertising matter of the manufacturer appears in proper position to be read. The wrapper 2 being transparent or sufficiently so to read the advertising matter therethrough, readily permits such advertising matter to be read when the package is opened and in the position disclosed in Figure 2.

It will be seen from the foregoing that an entirely sanitary package has been provided since while the inner wrapper bears advertising matter, the ink which forms the printing is on the exterior face of the inner wrapper and does not contact with the butter, cheese or the like. Despite this, all of the advantages of printing the advertising matter on the inner face of the inner wrapper are attained, since the inner wrapper being transparent, it permits the advertising matter to be readily read as clearly as though the same were printed directly on the inner face of the inner wrapper.

While I have stated that my improved wrapping is intended for use upon butter, cheese, and like products, it can be used upon many grocery products such as bread and many other similar packages which can be properly wrapped in the manner disclosed herein.

Having described my invention, what I claim is:

1. An article of the class described comprising a wrapper having an outer covering and an inner covering, said inner covering being composed of transparent material having printed matter in reverse form on its outer face whereby said printed matter is properly readable when viewed from the inner face of said inner covering.

2. An article of the class described comprising a wrapping for food products, said wrapping being composed of transparent material and having advertising matter printed in reverse form on its outer face.

3. An article of the class described comprising a wrapping for food products consisting of an inner wrapper and an outer wrapper, said outer wrapper being composed of opaque material, said inner wrapper being composed of transparent material and bearing advertising matter printed in reverse form on its outer face.

4. A wrapper for food products, composed of a sheet of transparent paper having advertising matter printed on its outer face in reverse form whereby said advertising matter is properly readable when viewed from the inner side of said wrapper and the ink producing said advertising matter is prevented from contacting with the food product.

Signed at the city of New York, county of New York and State of New York, this 3rd day of February, 1927.

LOUIS JOSEPHSON.